W. E. BURROWS.
VEHICLE WHEEL LOCKING DEVICE.
APPLICATION FILED MAY 26, 1917.

1,235,653.

Patented Aug. 7, 1917.

INVENTOR
William E. Burrows.

BY
George W. Hinton
ATTORNEY

UNITED STATES PATENT OFFICE.

WILLIAM E. BURROWS, OF ST. JOSEPH, MISSOURI.

VEHICLE-WHEEL-LOCKING DEVICE.

1,235,653.     Specification of Letters Patent.     Patented Aug. 7, 1917.

Application filed May 26, 1917. Serial No. 171,224.

*To all whom it may concern:*

Be it known that I, WILLIAM E. BURROWS, a citizen of the United States, residing at St. Joseph, in the county of Buchanan and State of Missouri, have invented certain new and useful Improvements in Vehicle-Wheel-Locking Devices, of which the following is a specification, reference being had therein to the accompanying drawing.

My invention relates to improvements in that class of devices which are used for locking a wheel of a vehicle, such as an automobile, truck and the like, for holding the vehicle against being moved by unauthorized persons.

The objects of my improvements are, to provide simple, substantial and durable devices of this class, by the use of which, the wheel of a vehicle can be easily and quickly locked, and the devices can be unlocked from said wheel and be secured beneath the running board of the vehicle, without soiling the hands of the operator of the devices. Further objects are to provide devices which can be locked by the use of an ordinary padlock.

Still further objects are to so construct the devices that they shall be extremely cheap in cost of manufacture, shall not obstruct the passage of persons getting into and from the vehicle, shall be noiseless and practically obscured from view, when not in use, and shall not mar the surface of the most highly finished vehicle wheel, when used thereon, as a locking device.

I attain these objects by the devices illustrated in the accompanying drawings, in which:—

Figure 1:
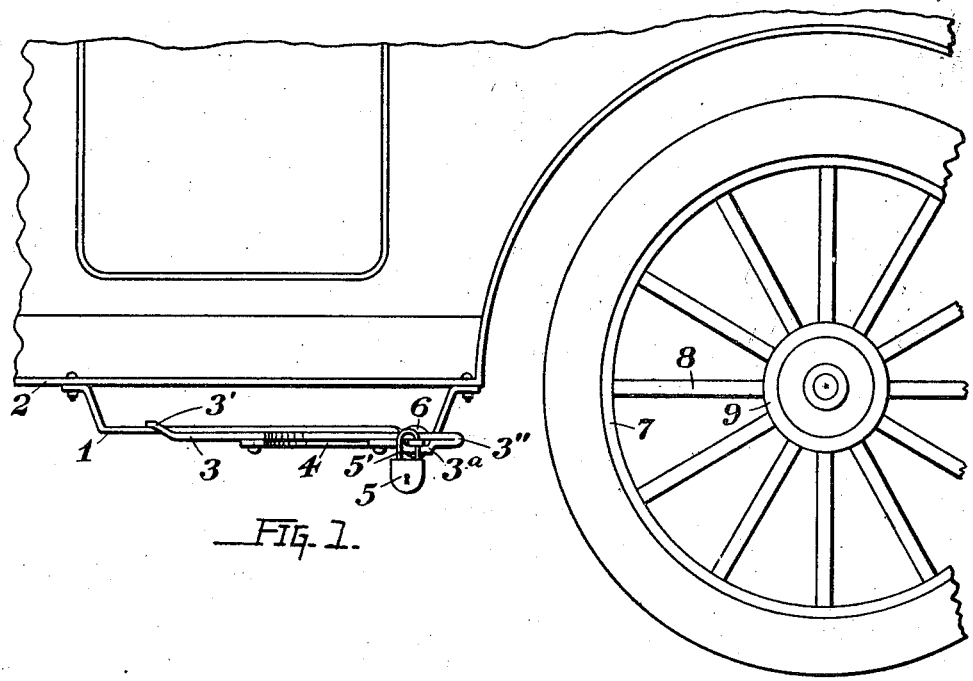
Figure 2:
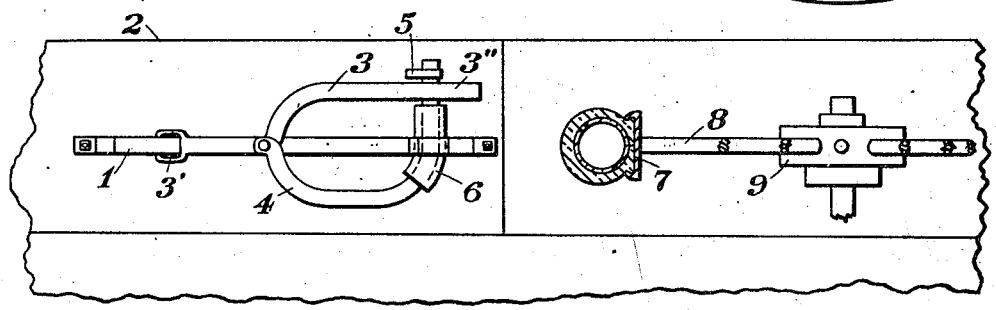
Figure 3:
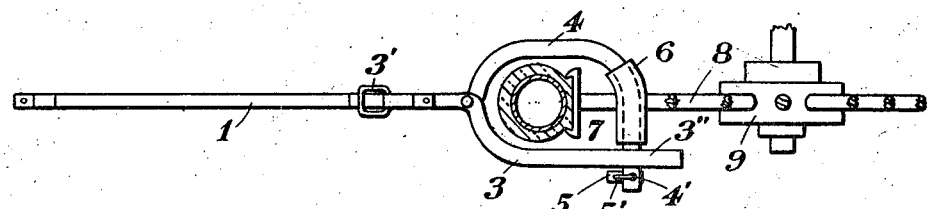

Figure 1 is a side view of the devices and of certain parts of an automobile, the devices being locked in position for transportation. Fig. 2 is a bottom plan of the parts seen in Fig. 1. Fig. 3 is a top plan of the devices, as they appear in position, locking a vehicle wheel, the running board of the automobile being removed.

Supporting bar 1 (see Fig. 1,) has its ends bent upward and secured on the under surface of the running board 2, of an automobile. Lock bar 3 has eye 3' formed through the left end thereof. Said eye is slidably mounted on bar 1, and is of such form, that it cramps said bar while said bars are in the position seen in Fig. 1, thereby pressing the free end of lock bar 3, in a downward direction.

This pressure holds bar 3 and the therewith connected parts in such manner that rattling of the parts is prevented.

The right end of bar 3 is bent backward beneath itself, forming handle 3" on its free extremity and opening 3ª therethrough, adjacent to said handle.

Lock bolt 4 has one of its ends pivotally connected with the central portion of bar 3, while its free end portion is formed of U shape, the extended end portion of which is covered by a piece of hose 6, placed thereon. The free extremity of said bolt has aperture 4' formed therethrough, through which the padlock bolt 5', of padlock 5 is passed. Said piece of hose forms an elastic covering for said portion of said bolt, for preventing the parts from rattling when in the position seen in Figs. 1 and 2, and prevents marring the surfaces of rim 7 and spokes 8 of an automobile wheel 9, when the parts are in the position seen in Fig. 3.

In the application of the devices, with the parts in the position seen in Fig. 1, padlock 5 is unlocked and is removed from the apertured end of bolt 4. The operator then grasps handle 3" and moves the same from said apertured end of bolt 4.

He then swings the free end of bolt 4 from over bar 1, and by handle 3", moves the parts toward the right. By the use of said handle, he places the parts in the position seen in Fig. 3, after which he places padlock 5 in the position shown, thereby locking wheel 9 against rotation.

When desired said operator reverses the described operations, thereby removing the devices from the position seen in Fig. 3, to the position seen in Figs. 1 and 2.

It will be understood from the foregoing description, that the operations of locking wheel 9 and of returning the parts to position, beneath the running board 2, are accomplished by grasping handle 3", which avoids the necessity of grasping parts which may have been soiled by earth; thereby enabling the operator to perform said operations, without soiling his hands.

It will also be understood, that while the parts are in the position seen in Fig. 1, that, due to the form of eye 3', bar 3 and the therewith connected parts, including hose 6, are pressed downward, thereby firmly holding said hose against bar 1, thereby preventing said parts from rattling.

Having fully described my invention, what I claim as new and desire to secure by Letters Patent, is:—

1. A supporting bar secured beneath the running board of an automobile; a lock bar having one of its ends slidably mounted on said supporting bar and its other end return bent, forming a handle thereon and an opening therethrough adjacent to said handle; a bolt having one of its ends pivotally connected with the central portion of said lock bar, the free end portion of said bolt being formed of U shape for adapting the same to engage the wheel of a vehicle, the extremity of said U shaped portion being passed through the opening through said lock bar, said extremity having an aperture formed therethrough for the reception of the bolt of a padlock; and an elastic cover on the wheel engaging part of the said free end portion of said bolt.

2. A supporting bar secured beneath the running board of an automobile longitudinally thereto; a lock bar having an eye formed through one end thereof said eye being slidable on said supporting bar and adapted to cramp said lock bar upon said supporting bar while said bars are kept in position, parallel to each other; a handle formed on the free end of said lock bar, there being an opening through said lock bar adjacent to said handle; a bolt having one of its ends pivotally connected with the central portion of said lock bar, the free end portion of said bolt being of suitable form to be passed between the spokes of a vehicle wheel, the extremity of said bolt being normally passed over an end portion of said supporting bar and through the opening formed through said lock bar; an elastic cover on the free end portion of said bolt; and securing means whereby the free extremity of said bolt is secured in place.

In testimony whereof I affix my signature in the presence of two witnesses.

WILLIAM E. BURROWS.

Witnesses:
 FRED. C. MOERI,
 AURELIO ARZADON.